United States Patent
Henderson et al.

(10) Patent No.: US 12,103,871 B2
(45) Date of Patent: Oct. 1, 2024

(54) ENHANCED INORGANIC COAGULANTS FOR WASTEWATER TREATMENT

(71) Applicant: CHEMTREAT, INC, Glen Allen, VA (US)

(72) Inventors: William Henderson, Midlothian, VA (US); Vladimir Djukanovic, Glen Allen, VA (US); Nicholas Seymour, Glen Allen, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 65 days.

(21) Appl. No.: 16/628,623

(22) PCT Filed: Jul. 3, 2018

(86) PCT No.: PCT/US2018/040794
§ 371 (c)(1),
(2) Date: Jan. 3, 2020

(87) PCT Pub. No.: WO2019/010227
PCT Pub. Date: Jan. 10, 2019

(65) Prior Publication Data
US 2020/0156968 A1 May 21, 2020

Related U.S. Application Data

(60) Provisional application No. 62/529,938, filed on Jul. 7, 2017.

(51) Int. Cl.
*C02F 1/52* (2023.01)
*C02F 1/66* (2023.01)
(Continued)

(52) U.S. Cl.
CPC .......... *C02F 1/5209* (2013.01); *C02F 1/5245* (2013.01); *C02F 1/66* (2013.01);
(Continued)

(58) Field of Classification Search
CPC ...................................... C02F 1/5209
See application file for complete search history.

(56) References Cited

U.S. PATENT DOCUMENTS 3,617,668 A 11/1971 Daniels et al.
3,956,118 A * 5/1976 Kleber .................. C02F 1/5236
210/907

(Continued)

FOREIGN PATENT DOCUMENTS

| KR | 10-0349154 | 8/2002 |
| WO | 00/06502 | 2/2000 |
| WO | 03/086564 A2 | 10/2003 |

OTHER PUBLICATIONS

Neo Chemicals & Oxides, RE300 Product Data Sheet, p. 1.
(Continued)

*Primary Examiner* — Peter Keyworth
(74) *Attorney, Agent, or Firm* — Oliff PLC

(57) ABSTRACT

A method for treating water to remove a target analyte that includes adding to the water a rare earth metal salt and a coagulant, and then removing the target analyte from the water. The treatment composition can be added as a blend that includes die coagulant and the rare earth metal salt.

18 Claims, 9 Drawing Sheets

(51) Int. Cl.
*C02F 101/10* (2006.01)
*C02F 101/14* (2006.01)

(52) U.S. Cl.
CPC .. *C02F 2101/103* (2013.01); *C02F 2101/105* (2013.01); *C02F 2101/106* (2013.01); *C02F 2101/14* (2013.01); *C02F 2209/06* (2013.01); *C02F 2209/07* (2013.01)

(56) References Cited

U.S. PATENT DOCUMENTS

| | | | |
|---|---|---|---|
| 2006/0086670 A1* | 4/2006 | Misra | C02F 1/285 |
| | | | 210/716 |
| 2007/0210005 A1* | 9/2007 | Fang | B01J 20/12 |
| | | | 210/683 |

OTHER PUBLICATIONS

Neo Chemicals & Oxides, Product Name: RE300, Safety Data Sheet, Creation Date: Mar. 20, 2017, pp. 1-8.
Neo Performance Materials, "Rare Earth Technology for Low-Level Phosphorus Removal and Enhanced Sludge Properties", Jul. 4, 2017, The Big Phosphorus Conference and Exhibition, Alan Weber, Neo Performance Materials, pp. 1-24.
International Searching Authority, Notification of Transmittal of the International Search Report and the Written Opinion of the International Searching Authority or the Declaration, date of mailing Sep. 25, 2018, pp. 13.

* cited by examiner

ENHANCED INORGANIC COAGULANTS FOR WASTEWATER TREATMENT

BACKGROUND

Regulatory agencies place discharge limits on pollutants such as phosphorus, selenium, arsenic, fluoride and heavy metals. Facilities have used commodity coagulants for decades to remove these contaminants with mixed results. Some common coagulants include ferric sulfate, ferric chloride, Potassium Aluminum Sulfate (Alum), Aluminum chloride, Aluminum Sulfate, Polyaluminum Chloride, and Aluminum Chlorohydrate, Calcium chloride, Magnesium Hydroxide, Magnesium Chloride, Lime, Bentonite Clay, Modified Starches, Tannins and Lignins. It is common to use slurries of insoluble inorganic coagulants or solutions of soluble coagulants to remove total dissolved solids (TDS) and total suspended solids (TSS), which include dissolved target elements for removal.

In almost all cases, an excess of coagulant must be used to remove target elements. For example, to remove 65 ppm of phosphate down to 6 ppm at pH 7 it requires 900 ppm of ferric chloride.

Excess coagulant feed results in higher chemical costs and generates excess sludge, which must be disposed of. Sometimes this excess sludge must be disposed of as hazardous waste. Additionally, some inorganic coagulants create sludge that is hard to dewater, further increasing disposal costs. Sludge containing cerium (Ce) is typically compact while sludge containing aluminum tends to hold more water. Aluminum coagulants can also adversely affect the microbial population in activated sludge, especially protozoa and rotifers. Some coagulants, such as $FeCl_3$ can cause corrosion to equipment.

Alkalinity may be added to waste streams in order to help biological processes such as nitrification/denitrification. Coagulants such as ferric and aluminum consume and are consumed by, alkalinity which can affect nitrification processes and creates additional demand for the product. In contrast, cerium is not affected by alkalinity.

SUMMARY

In these cases it would be advantageous to decrease the amount of coagulants, such as $Fe^{3+}$, that are used to remove TSS or analytes in water, while still effectively removing the target analyte.

In one aspect, a method of treating water containing a target analyte to remove the target analyte is provided. The method includes determining the pH and/or alkalinity of the water; controlling the pH and/or alkalinity of the water to be within a target range; adding to the water at least one rare earth metal salt and at least one coagulant; and then removing the target analyte from the water.

In another aspect, a method of treating water containing a target analyte to remove the target analyte is provided. The method includes determining the pH and/or alkalinity of the water; based on the determined pH and/or alkalinity, determining an effective treatment to remove the target analyte including (i) an effective amount of at least one rare earth metal salt; and (ii) an effective amount of at least one coagulant; and adding to the water the effective amount of the at least one rare earth metal salt and the effective amount of the at least one coagulant.

DETAILED DESCRIPTION OF EMBODIMENTS

Figure 1:
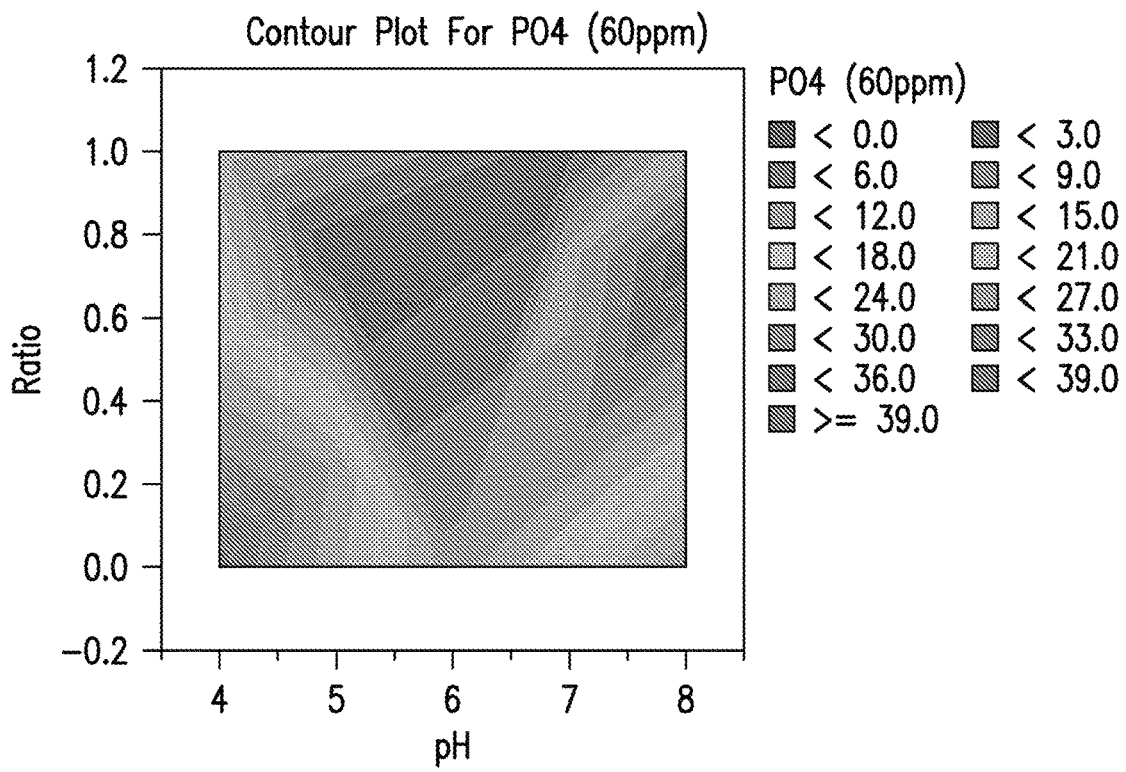
FIGS. 1-6 and 9-15 are contour plots showing the efficiency of cerium chloride/coagulant blends in removing target analytes.

In one aspect, this disclosure is directed to the unexpected discovery of a rare earth metal salt, such as $CeCl_3$, which demonstrates a synergy with other coagulants in removing target analytes. Although the examples described herein use cerium sat ($CeCl_3$), it would be expected that other rare earth metal salts such as lanthanum salts would show similar synergy with other coagulants.

Treating systems with a rare earth and another coagulant has an enhanced effect when parameters are controlled, such as pH or alkalinity. This synergy can be taken advantage of to decrease chemical treatment costs or to optimize treatment. Some advantages include: decrease in chemical consumption, decrease in overall sludge generation, decrease in corrosion of equipment, prevention of interference with biological processes and decreased consumption of alkalinity.

It has further been discovered that at various pHs and/or alkalinities there is a synergy that allows for treatment of wastewater that costs significantly less by using coagulant/rare earth in combination, when compared to either rare earth salts or inorganic coagulant alone. While rare earth salts have been used to remove TSS and TDS in wastewater, they are expensive and thus their cost to treat is expensive as well.

This disclosure thus employs a combination of a rare earth and another coagulant in coagulant applications for removing target analytes. Coagulants are used, for example, in water treatment applications to remove analytes from water streams, e.g., waste water streams. In this regard, metal salts and other coagulating agents are typically used in water treatment to effect a charge disruption that neutralizes repulsive forces in particles, which causes the particles or analyte to aggregate or floc, which enables them to be removed by filtration or other means.

In accordance with this disclosure, the at least one rare earth metal salt can be combined with any other coagulants, including one or more of ferric sulfate, ferric chloride, Potassium Aluminum Sulfate (Alum), Aluminum chloride, Aluminum Sulfate, Polyaluminum Chloride, and Aluminum Chlorohydrate, Calcium chloride, Magnesium Hydroxide, Magnesium Chloride, Lime, Bentonite Clay, Modified Starches, Tannins and Lignins. The at least one rare earth metal salt can include, for example, cerium and lanthanum salts.

The treatment may be accomplished by adding the coagulant together with the rare earth to a water stream that is allowed to accumulate in a tank, pond, or other holding area. The rare earth and coagulant can be added to the water separately or together as a blend. The water can then be mechanically stirred or mixed to allow the target analyte of interest (e.g., phosphate) to aggregate. The aggregate can then be separated from the water, e.g., by filtration, which will remove the analyte from the water. Multiple tanks or holding ponds (e.g., 2 to 10) can be arranged in series to improve the removal. The time period to achieve effective aggregation that can be removed may be in the range of 10 minutes to 4 hours, 20 minutes to 2 hours, and 30 minutes to 1 hour.

As indicated above, the rare earth metal salt shows a synergy with coagulants so that the combination is more effective than would be expected based on the performance of each separately. As demonstrated in the Examples below, the optimum ratio depends on the target analyte being removed, and the pH or alkalinity. The rare earth metal salt can be added in a weight ratio to total coagulant additives, i.e., on a dry basis, rare earth salt/(rare earth salt+other coagulants), that is in the range of 0.05-0.95, from 0.1-0.9, from 0.3-0.7, or from 0.4-0.6.

Before treatment, the target analyte may be present in the water in amounts in the range of from 1 ppm to 1,000 ppm, from 2-10 ppm, from 30 to 200 ppm, and from 50 to 100 ppm. Preferably, the combination of (i) the dosage of the rare earth and coagulant, and (ii) the pH and/or alkalinity, are selected or controlled such that at least 50 wt. % of the target analyte is removed from the water, and preferably at least 75 wt. %, at least 90 wt. %, at least 95 wt. %, and at least 99 wt. %. After treatment, the analyte can be present in amounts of less than 20 ppm, less than 10 ppm, less than 6 ppm, or from 10 ppb to 3 ppm.

The total dosage of rare earth and coagulant can be, on a dry basis, in the range of, for example, from 20 ppm to 2,000 ppm in the water, from 100 ppm to less than 1,500 ppm, from 150 ppm to less than 1,000 ppm, and from 200 ppm to less than 750 ppm.

Where an aluminum salt or an iron salt is used as the coagulant, it can be present in an amount of, on a dry basis, from 20 ppm to 600 ppm, from 100 ppm to 400 ppm, or from 200 ppm to 300 ppm. As indicated above, using less of these types of salts can decrease sludge and sludge removal efforts.

Whether added separately or as a blend, the rare earth and coagulant can be added as a solid salt form, or preferably as an aqueous solution. The aqueous solution can include rare earth and/or coagulant in a total amount in the range of 10 to 70 weight percent, from 20 to 60 weight percent, or from 30 to 45 weight percent, where the balance is primarily water. Thus, in some aspects, the aqueous solution can include from 2 wt. %-25 wt. % rare earth metal salt and from 2 w. %-25 wt. % of coagulant, from 5 wt. %-20 wt. % of the rare earth metal salt and from 5 wt. %-20 wt. % of the coagulant, or from 5 wt. %-15 wt. % of the rare earth metal salt and from 15 wt. %-25 wt. % of the coagulant. Typically, the rare earth metal salt will be present in a lower amount than the coagulant.

Any target analyte typically removed by coagulants can be removed by the rare earth/coagulant combination, such as anionic target analytes including phosphate, fluoride, arsenate, arsenite, selenite, selenate, and anions of aluminum, thallium, zinc, copper, and lead. The treatment may also be effective to remove or decrease total suspended solids (TSS), total dissolved solids (oil/grease), chemical oxygen demand (COD), and biochemical oxygen demand (BOD). For example, one of the rare earth and/or coagulant may be added to the water to remove TSS while the other is used to remove an anionic target analyte. In this situation, the combination can achieve synergy in removing the target analyte if the pH and/or alkalinity is controlled to optimize the removal efficacy.

In one aspect, because the synergy of the rare earth metal salt and coagulant depend on the pH and/or alkalinity of the water, these properties can be measured or controlled to optimize the synergy. Here also, and as demonstrated by the Examples below, the particular optimum value can depend on the target analyte, the dosage, and the coagulant(s). In general, the pH can be measured (e.g., with a pH meter, pH paper, titration, etc.) and controlled so that the water is maintained within a target pH range (e.g., by adding caustic or an acid). Depending on the factors indicated above, the target pH range may be between 5 and 7, between 5 and 6.5, between 7.5 and 8, between 4.5 and 6.5, between 6 and 8, or between 4.5 and 5.5. Alkalinity can similarly be measured (e.g., dye indicators, titration, etc.) and controlled to be within an optimal range (e.g., by adding buffer). The control system can be automated by including on-line pH or alkalinity monitors that send measurement information to a computer, processor, or other controller, which in turn, communicates with pumps and/or valves that add acid, base, or buffer to keep the water within the target range.

In another aspect, e.g., where it may not be feasible to readily alter the pH or alkalinity of the water, the ratio and dosage of the rare earth/coagulant combination can be selected to be optimal for those properties. The ratio and dosage can be determined based on empirically determined efficacies for removing the target analyte at varying pH levels and/or alkalinity levels, e.g., such as the contour plots discussed below in connection with the drawings.

EXAMPLES

In the following examples, CeCl3 is used in combination with another coagulant to determine efficacy of the combination in removing a target analyte, such as phosphate. Contour plots were prepared showing the removal efficacy at different pHs and different ratios of CeCl3 and coagulant. In the plots, the y-axis "ratio" is the weight ratio of CeCl3 to the coagulant plus CeCl3, i.e., CeCl3/(CeCl3+coagulant). CeCl3 and the coagulants are provided as aqueous solutions that each include about 40 wt. % of active ingredient. The weight ratios in these examples and the dosages refer to the weight of these liquid products.

FIG. 1 is a contour plot showing the overall efficiency of combinations of CeCl3 and Aluminum Chloride at various pHs regardless of dosage for PO4 removal—the data is taken over a wide range of dosages of the CeCl/coagulant blend, e.g., about 60 ppm to 700 ppm of liquid product. As shown, there is a synergy between CeCl3 and Aluminum Chloride. By controlling pH we can increase the efficiency and "cost to treat" by taking advantage of synergistic high points such as a 40% Aluminum Chloride/60% CeCl3 blend between the pH of 5 and 6.5.

Figure 2:
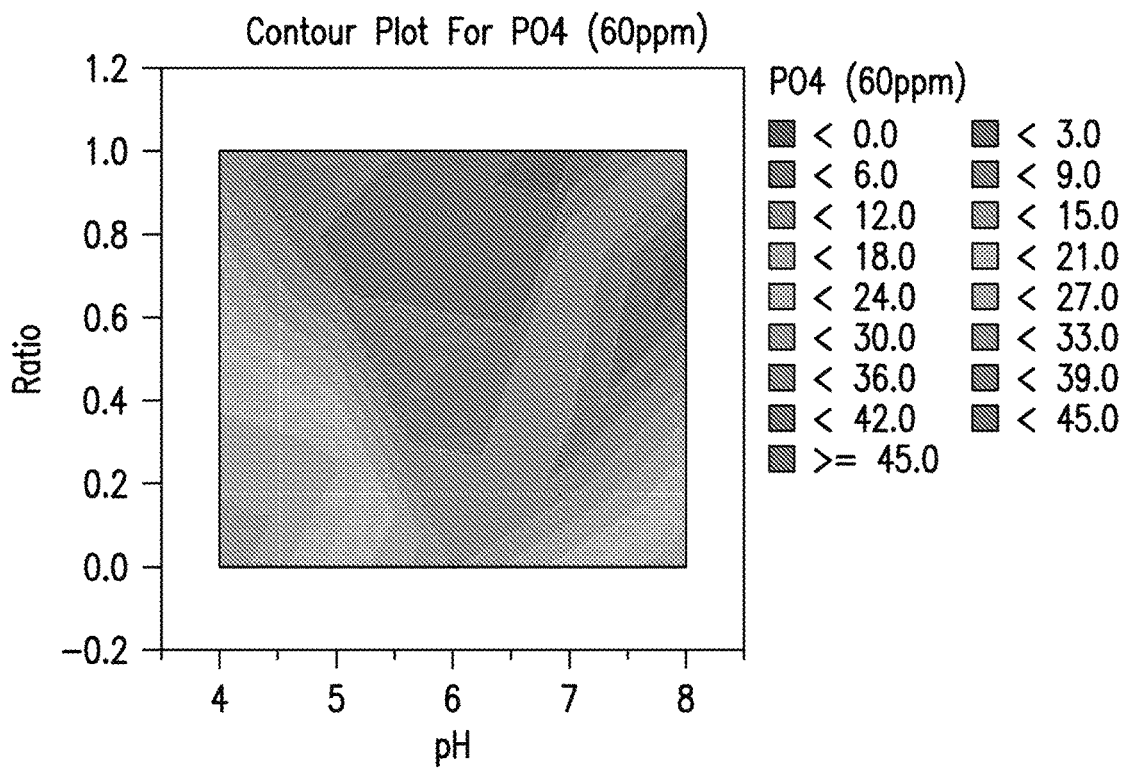

FIG. 2 is a contour plot showing the overall efficiency of combinations of CeCl3 and aluminum chlorohydrate (ACH) at various pHs regardless of dosage for PO4 removal. As shown, there is a synergy between CeCl3 and ACH. By controlling pH we can increase the efficiency and "cost to treat" by taking advantage of synergistic high points such as a 5-40% ACH/60-95% CeCl3 blend between the pH of 5-6.5 or 7.5-8.

Figure 3:
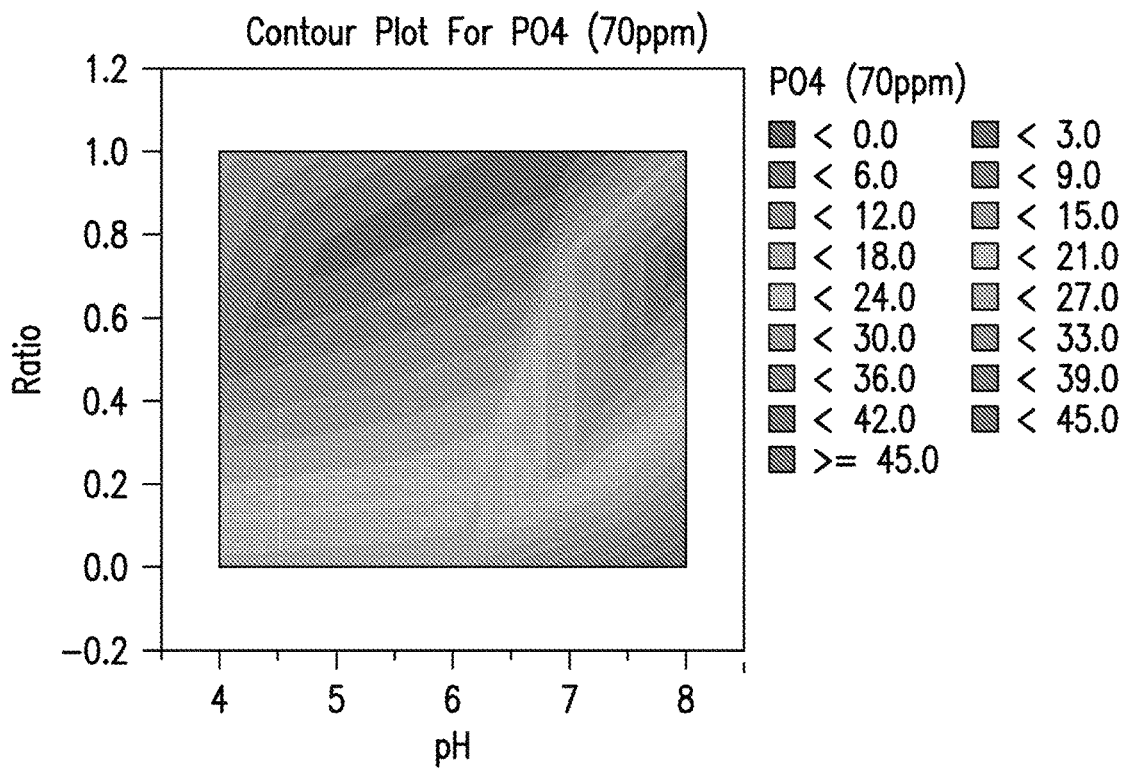

FIG. 3 is a contour plot showing the overall efficiency of combinations of CeCl3 and FeCl3 at various pHs regardless of dosage for PO4 removal. As shown, there is a synergy between CeCl3 and FeCl3. By controlling pH we can increase the efficiency and "cost to treat" by taking advantage of synergistic high points such as a 5-45% FeCl3/55-95% CeCl3 blend between the pH of 4.5-6.5 or 7.5-8.

Figure 4:
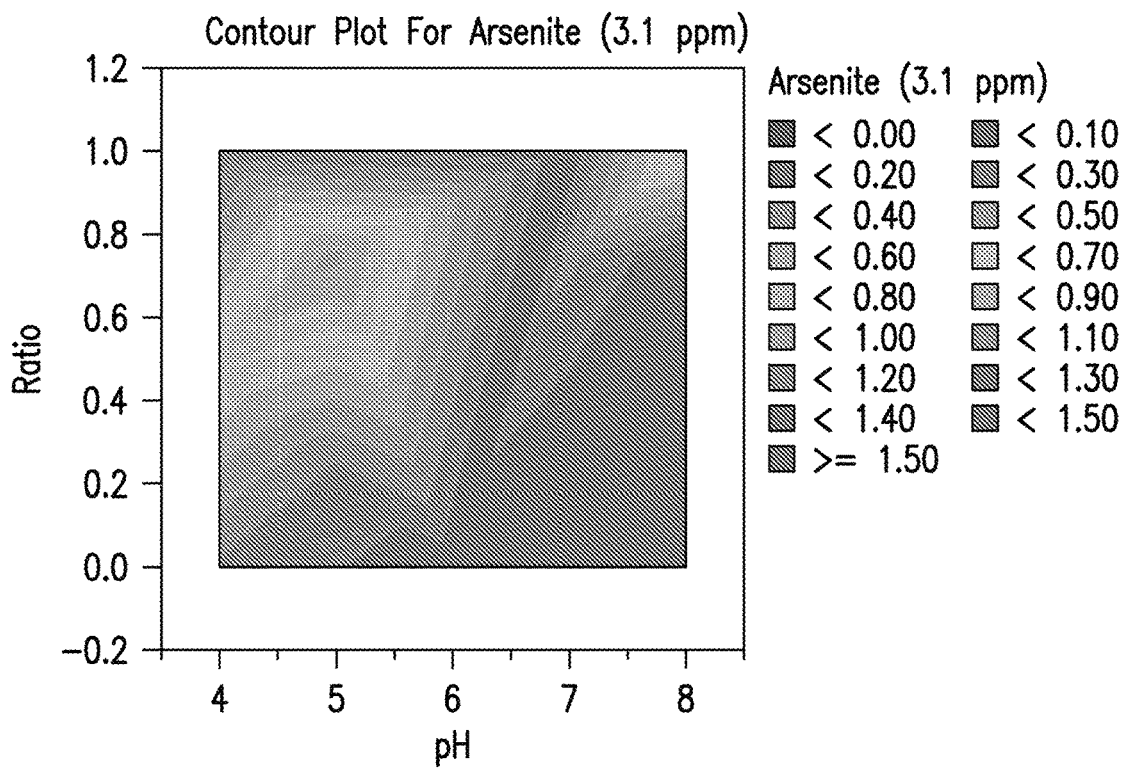

FIG. 4 is a contour plot showing the overall efficiency of combinations of CeCl3 and FeCl3 at various pHs regardless of dosage for arsenite removal. As shown, there is a synergy between CeCl3 and FeCl3. By controlling pH we can increase the efficiency in applications where the use of Fe salts is not desirable by taking advantage of synergistic high points such as a 20-80% FeCl3/20-80% CeCl3 blend between the pH of 6-8.

Figure 5:
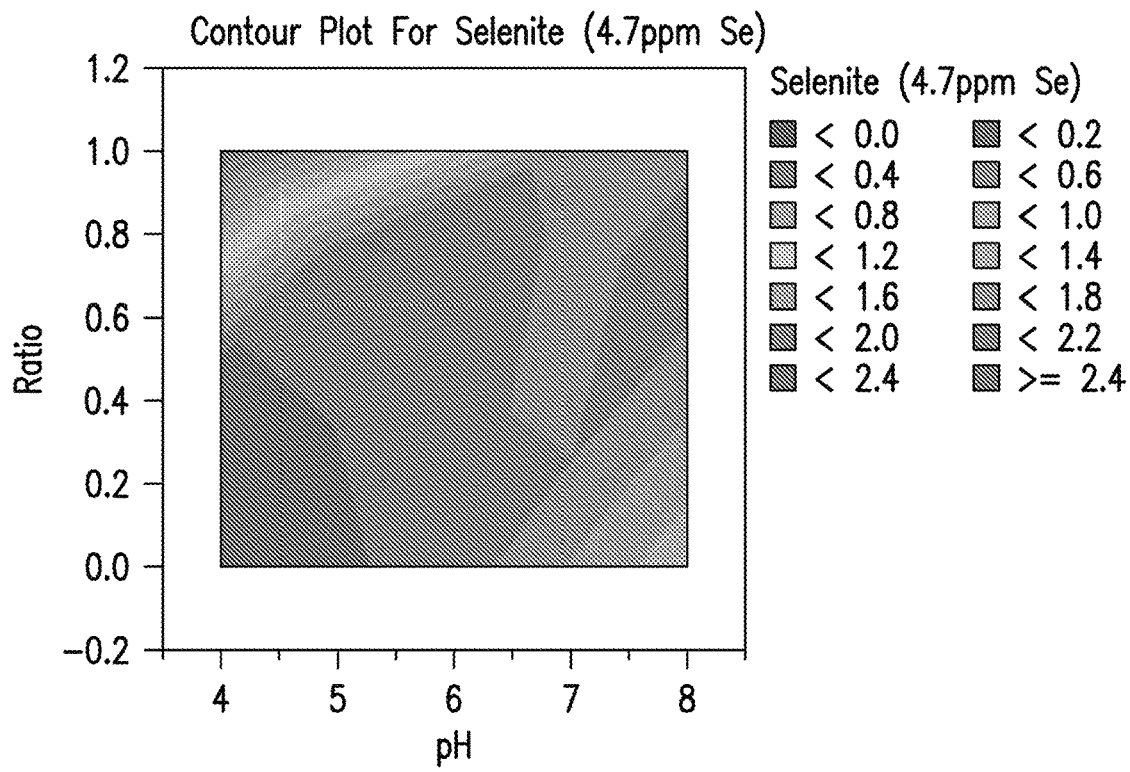

FIG. 5 is a contour plot showing the overall efficiency of combinations of CeCl3 and FeCl3 at various pHs regardless of dosage for selenite removal. As shown, there is a synergy between CeCl3 and FeCl3. By controlling pH we can increase the efficiency and "cost to treat" by taking advantage of synergistic high points such as a 15-75% FeCl3/25-85% CeCl3 blend between the pH of 7-8.

Figure 6:
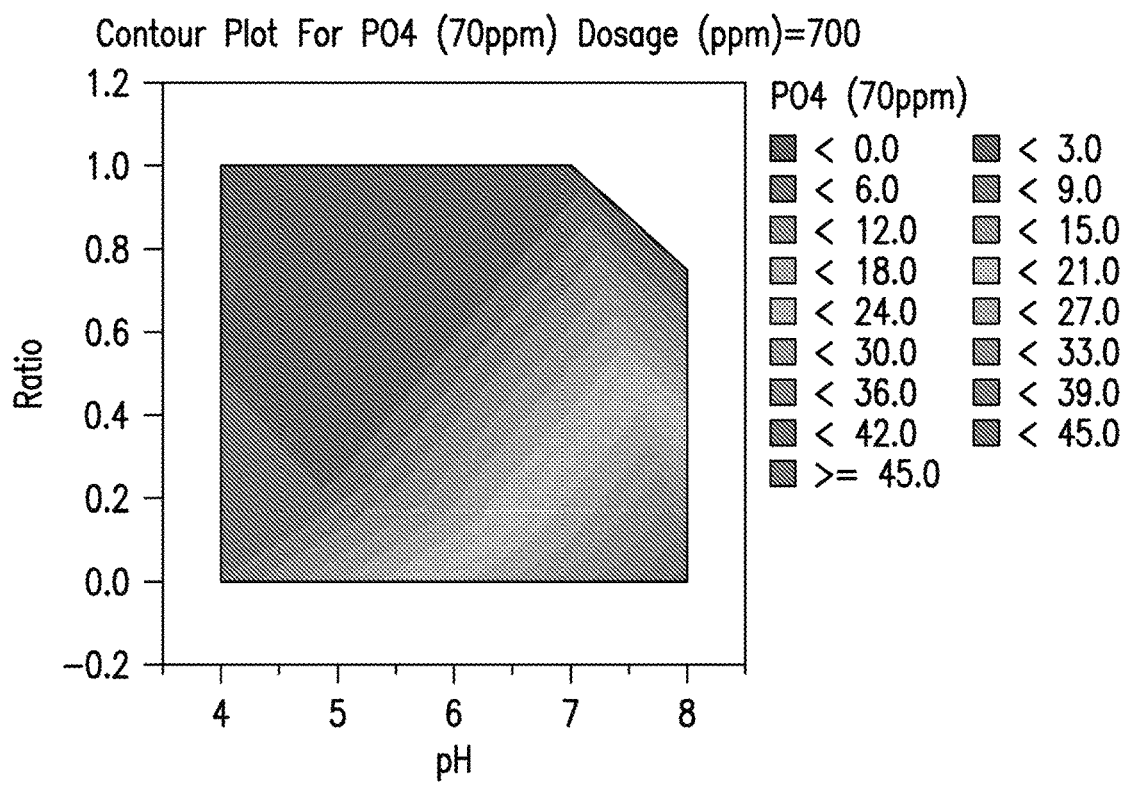

FIG. 6 is a contour plot showing the removal of 70 ppm of PO4 with a ratio of 100%/o ferric chloride to 100% cerium chloride at various pHs. In these experiments, the total dosage of the CeCl3/FeCl3 blend was kept constant at 700 ppm of liquid product. While the previous plots showed an overall synergy between coagulants regardless of dosage, this plot is dose specific. From this initial contour plot it is shown that 100% ferric chloride does not adequately treat this water. CeCl3 is expensive and it is not desirable to use the required dosages of this product in many cases. However, if a product comprised of a mixture of 25% cerium chloride and 75% ferric chloride is added at the same dosage to wastewater at pH=4.5-5 the product is able to remove 70 ppm PO4 down to 0 ppm PO4. These results could not be predicted from feeding either 100% ferric chloride or 100% cerium chloride. Furthermore, this synergy would not be obvious by testing mixtures alone without controlling pH.

Figure 7:
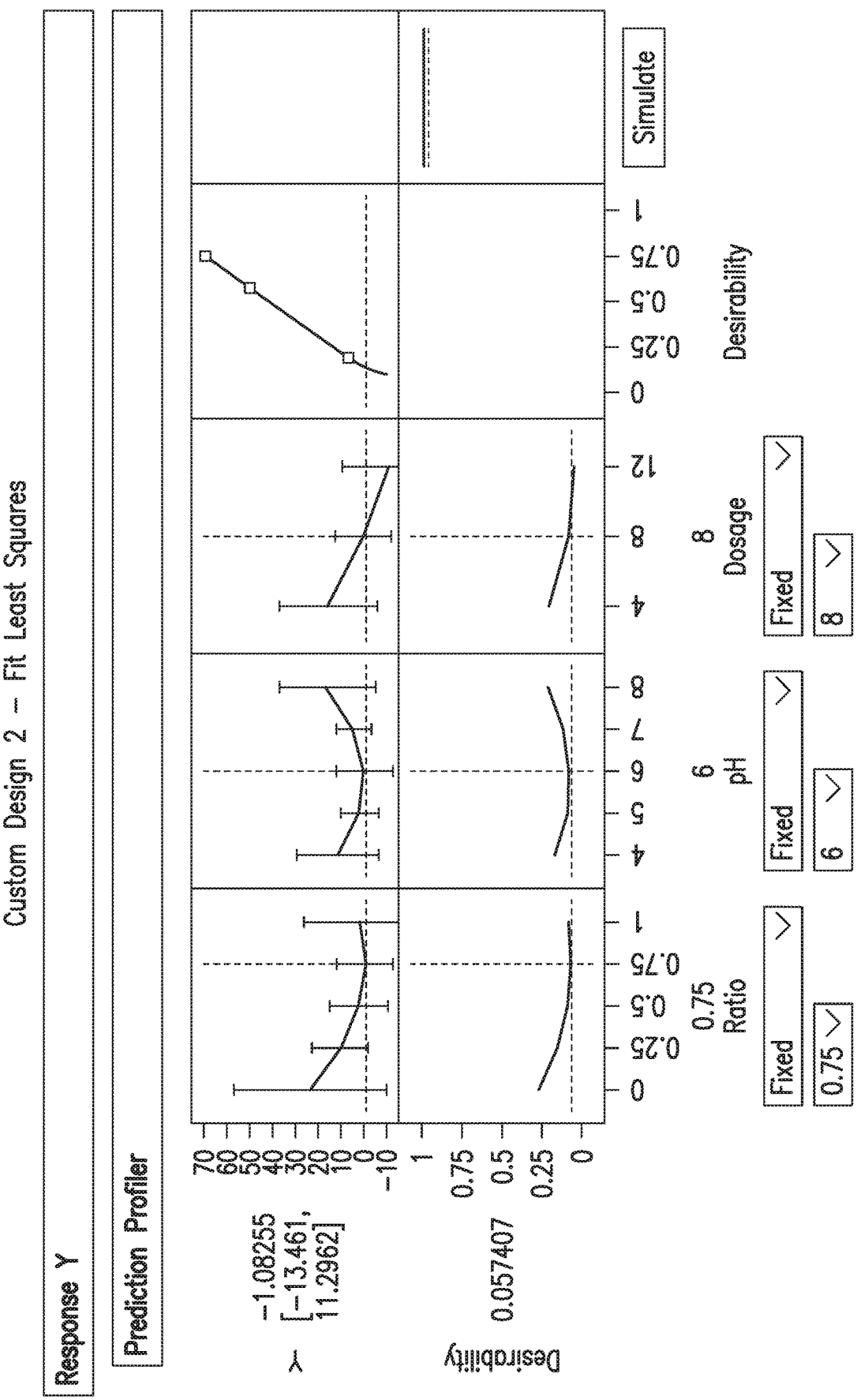
FIG. 7 is a graph showing relationships between variables for the contour plot of FIG. 6.

FIG. 7 is a graph showing relationships between variables for the data used in the contour plot of FIG. 6. This figure further illustrates the synergistic relationships between compound ratio (defined as above) and pH. The y-axis of the top row graphs shows the phosphate concentration in water and the y-axis of the bottom row graphs show the normalized phosphate concentration. The x-axis sequentially shows the compound ratio, pH, dosage (dosage values are in multiples of 60 ppm liquid product, e.g., "8" is 480 ppm liquid product), and desirability. As can be seen, although the phosphate concentration decreases with higher dosages as would be expected, there is an unexpected synergy at certain pH values and ratios of rare earth and coagulant. For example, in this figure a ratio of 0.75 at a pH of 6 provides the maximum amount of phosphate removal. As can be seen in the graph, increasing the rare earth content to more than 0.75 at the pH of 6 will actually negatively affect the phosphate removal. Likewise, changing the pH will negatively affect the phosphate removal.

As shown in the data presented herein, this synergistic high point range exists for many target analytes and many different coagulants. Thus, a synergistic "high point" target range can be selected and the water system can be controlled to maximize removal efficiency. The synergistic high point range may be within +/−20% of the maximum-efficiency weight ratio (e.g., in this case, 0.60-0.90) and between +/−1.0 of the maximum-efficiency pH (e.g., in this case, 5-7), or alternatively within +/−10% of the maximum-efficiency weight ratio (e.g., in this case, 0.675-0.825) and between +/−0.5 of the maximum-efficiency pH (5.5-6.5). For synergistic high points based on alkalinity, the target range can be selected based on +/−20% or +/−10% of the maximum-efficiency alkalinity value.

Figure 8:
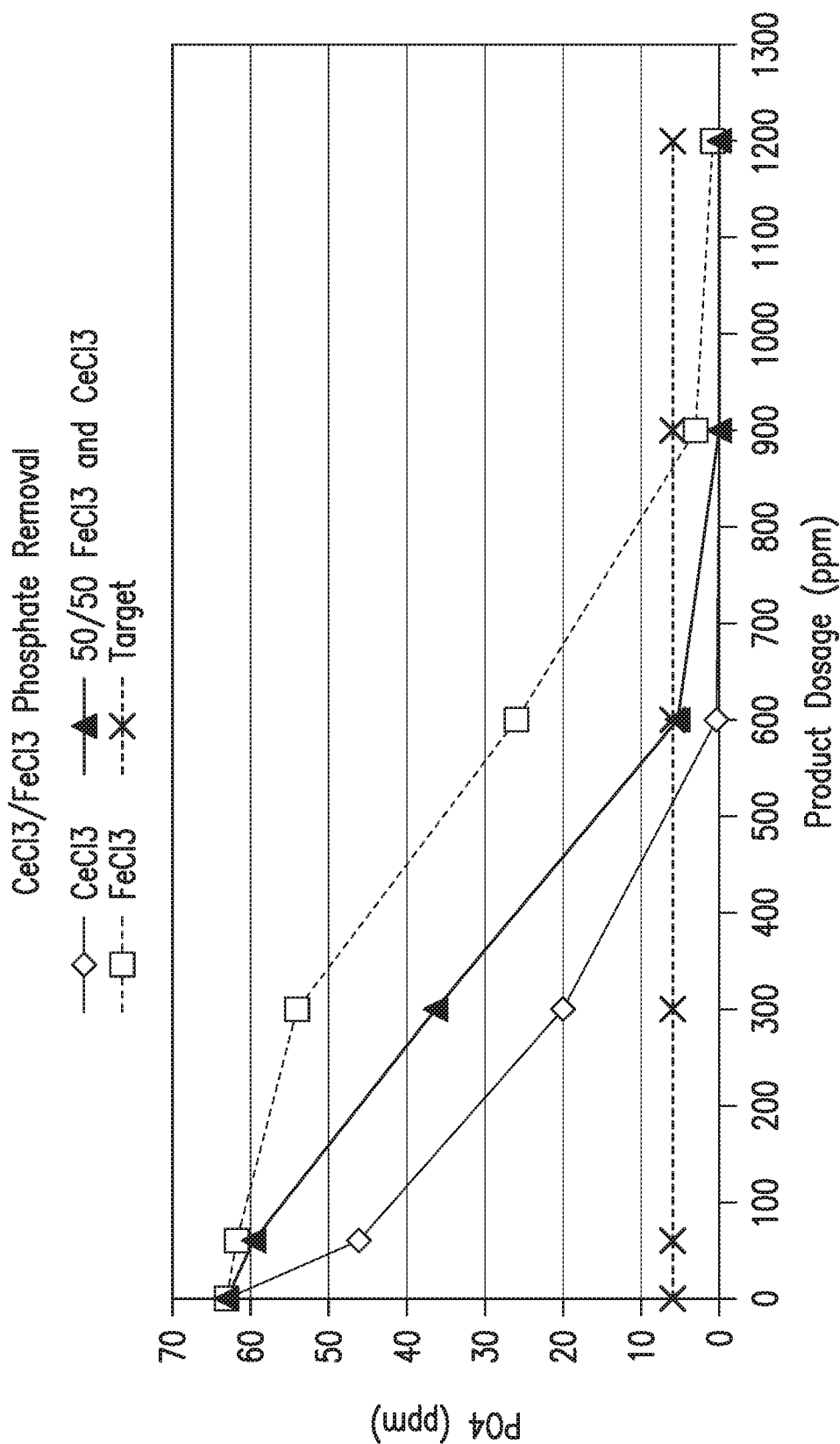
FIG. 8 is a graph showing individual experiments for removing phosphate using (i) a ferric chloride solution, (ii) a cerium chloride solution, and (iii) a blend of these solutions.

FIG. 8 is a graph showing individual experiments using ferric chloride solution and cerium chloride solution both independently and at a 1:1 ratio of the respective solutions. The 1:1 solution ratio corresponds to a weight ratio of CeCl/(CeCl+FeCl3) of 0.44. The data from these experiments is tabulated in Table I below. At a facility with an effluent target of 6 ppm PO4, FeCl3 is able to adequately remove PO4 at a 900 ppm dose, while CeCl3, a much more expensive material, requires ~530 ppm. However, a blend of both at 600 ppm adequately treats this water to desired levels. This blend, containing only about 300 ppm of CeCl3 and 300 ppm FeCl3 is cheaper than feeding CeCl3 and generates less sludge than treating with 900 ppm FeCl3. Ferric chloride is corrosive to equipment and a safety concern. Ferric chloride also consumes alkalinity which can affect nitrification and creates additional demand for the product.

TABLE 1

| P8200L (32%) CeCl3 | | | |
| --- | --- | --- | --- |
| mg/L P8200L: 1 mg/L PO4 | P8200L | mg/L CeCl3 ppm: mg/L PO4 | PO4 ppm |
| 0 | 0 | 0.0 | 63 |
| 1 | 60 | 0.3 | 46 |
| 5 | 300 | 1.5 | 20 |
| 10 | 600 | 3.0 | 0.21 |
| 15 | 900 | 4.0 | 0 |
| 20 | 1200 | 8.1 | 0 |
| P8281L (40%) FeCl3 Solution, 12% as Fe | | | |
| mg/L P8281L: 1 mg/L PO4 | P8281L | mg/L FeCl3 ppm: mg/LPO4 | PO4 ppm |
| 0 | 0 | 0.0 | 63 |
| 1 | 60 | 0.4 | 62 |
| 5 | 300 | 1.9 | 54 |
| 10 | 600 | 3.8 | 26 |
| 1.5 | 900 | 5.7 | 3 |
| 20 | 1200 | 7.6 | 0.69 |
| 50% P8200L + 50% P8281L (CeFe) | | | |
| mg/L P8200IL: 1 mg/L PO4 | m/LP8281L: 1 mg/LPO4 CeFe | mg/L P8281L ppm: mg/L PO4 | PO4 ppm |
| 0 | 0 | 0 | 63 |
| 0.5 | 0.5 | 60 | 59.5 |
| 2.5 | 2.5 | 300 | 36 |
| 5 | 5 | 800 | 5.5 |
| 7.5 | 7.5 | 900 | 0 |
| 10 | 10 | 1200 | 0 |

Figure 9:
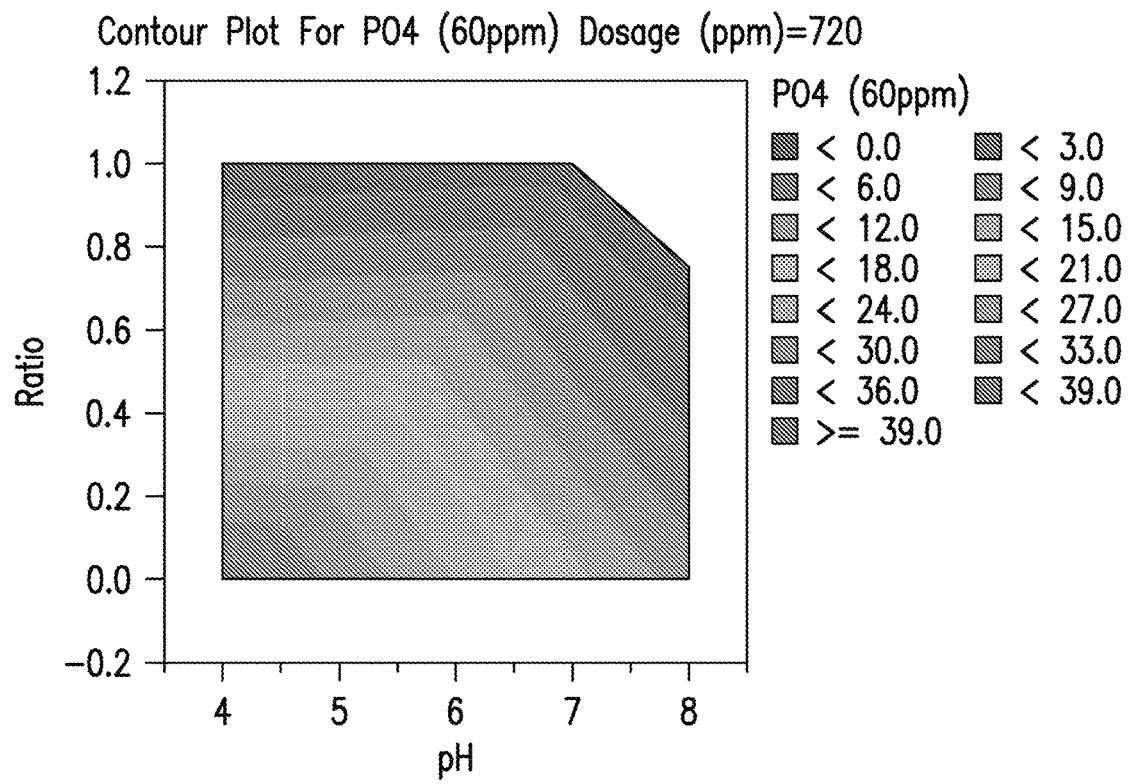

FIG. 9 is a contour plot showing the efficiency of combinations of CeCl3 and AlCl3 in removing phosphate at various pHs at a dosage of 720 ppm. In this example, combining CeCl3 with AlCl3, we could use the target water existing pH to formulate a blend that performs optimally or we could adjust pH to optimize the "cost to treat". Both methods might be advantageous depending on alkalinity and buffering. In high alkalinity water or highly buffered water it may take an excessive amount of acid or base to adjust to the optimal pH for product performance. In those cases, we would use the existing pH to formulate an optimal blend of coagulants. At some facilities, excessive aluminum is avoided due to sludge disposal and dewatering concerns. Aluminum containing sludge is typically much harder to dewater. Aluminum coagulants can also adversely affect the microbial population in activated sludge, especially protozoa and rotifers, at dosage rates higher than 150 mg/l.

Figure 10:
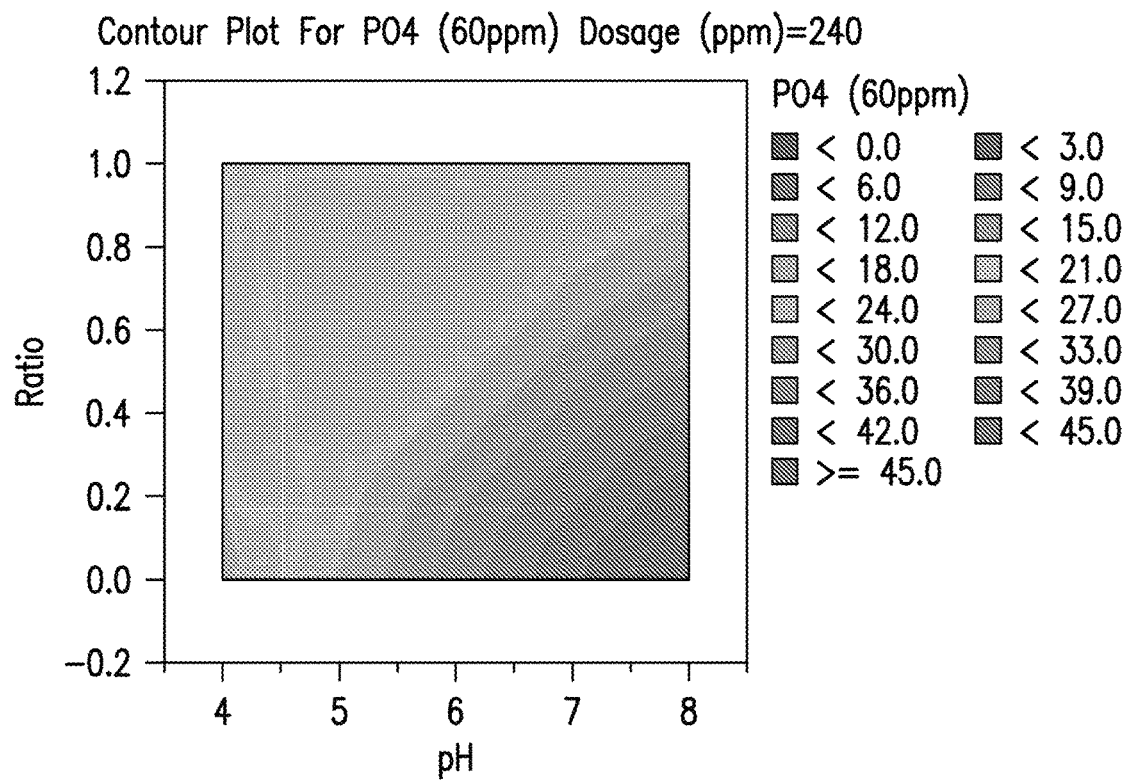

FIG. 10 is a contour plot showing the efficiency of combinations of CeCl3 and ACH in removing phosphate at various pHs at a dosage of 240 ppm. In this example, combining CeCl3 with ACH, we could use the target water existing pH to formulate a blend that performs optimally or we could adjust pH to optimize the "cost to treat". Both methods might be advantageous depending on alkalinity and buffering. In high alkalinity water or highly buffered water it may take an excessive amount of acid or base to adjust to the optimal pH for product performance. In those cases, we would use the existing pH to formulate an optimal blend of coagulants.

Figure 11:
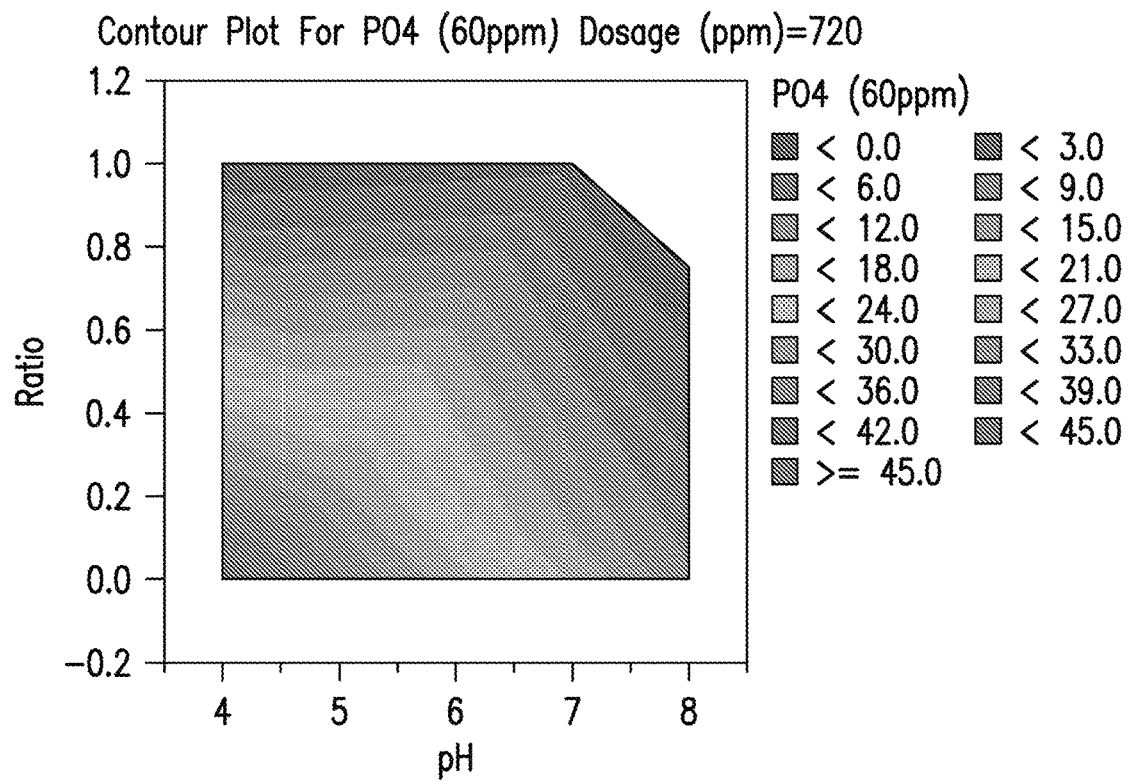
Figure 12:
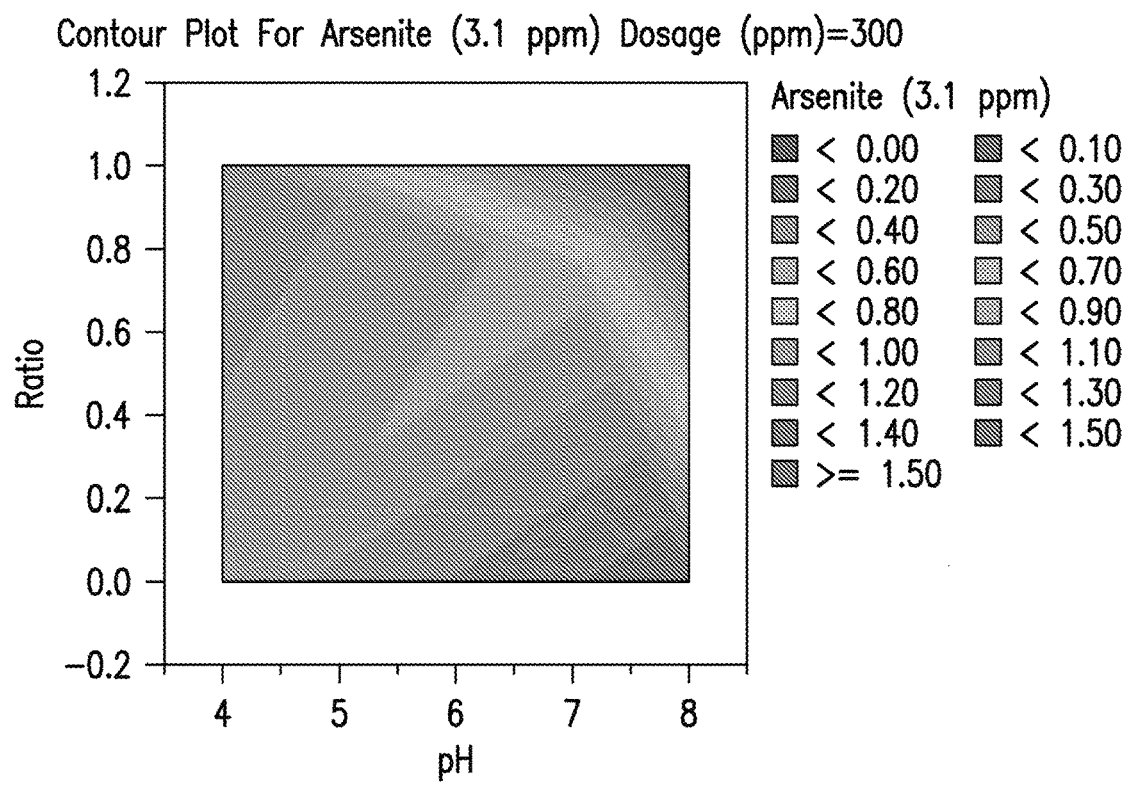
Figure 13:
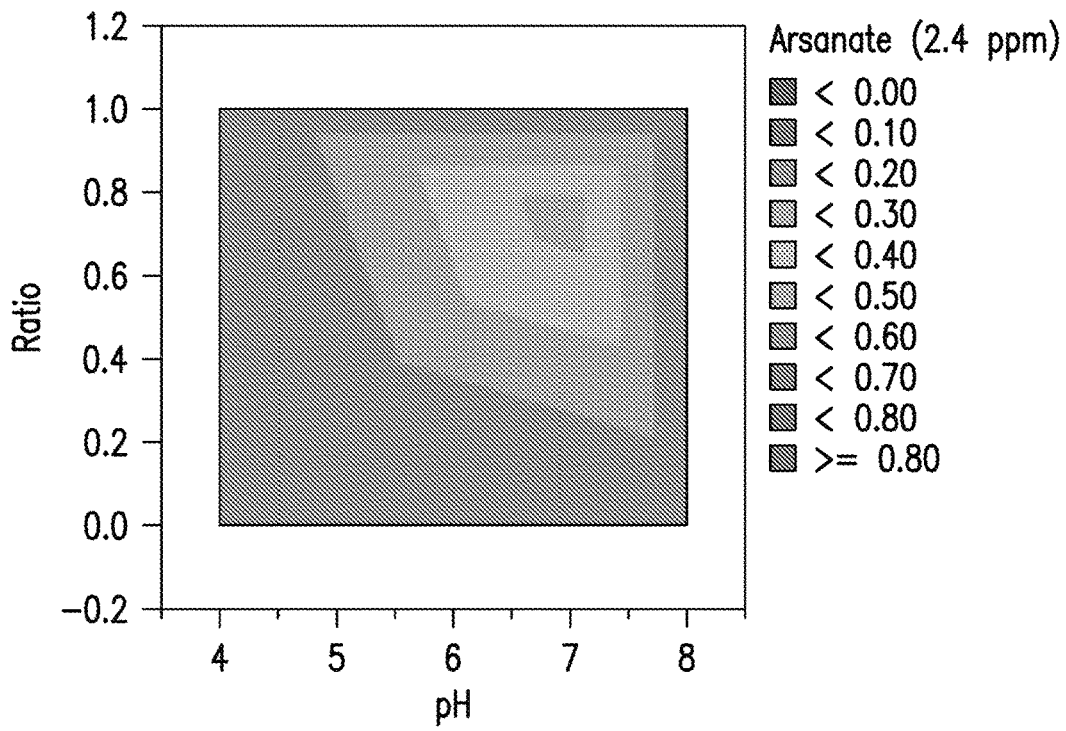
Figure 14:
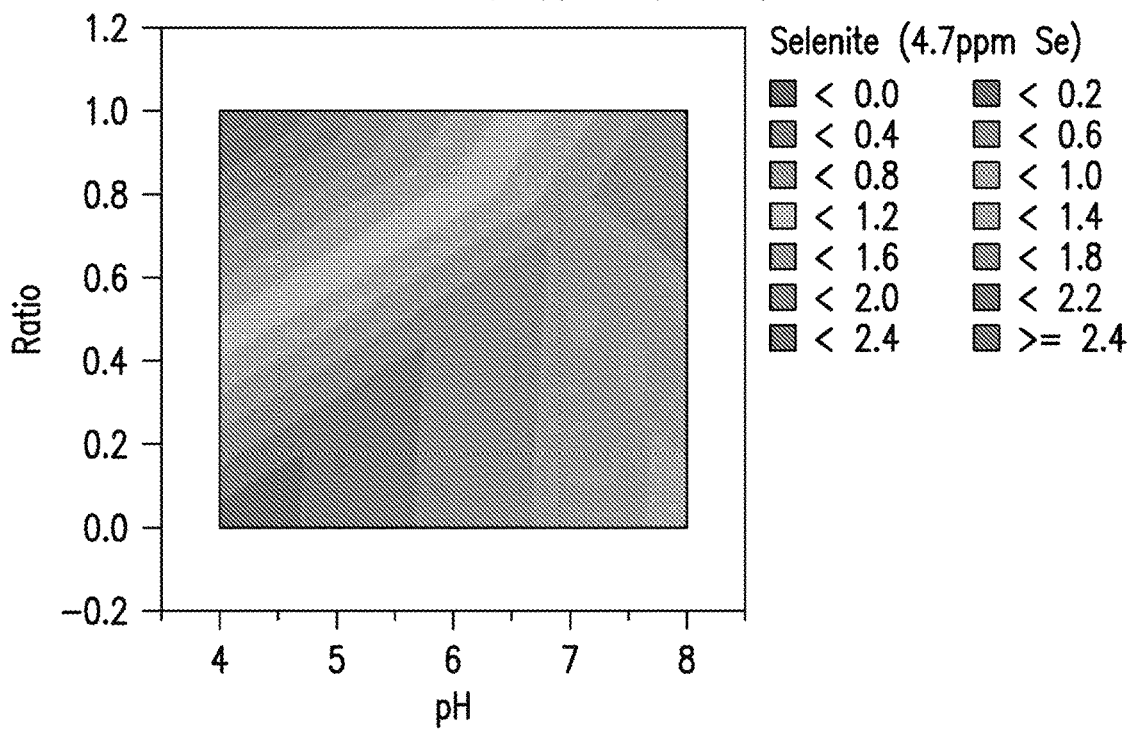
Figure 15:
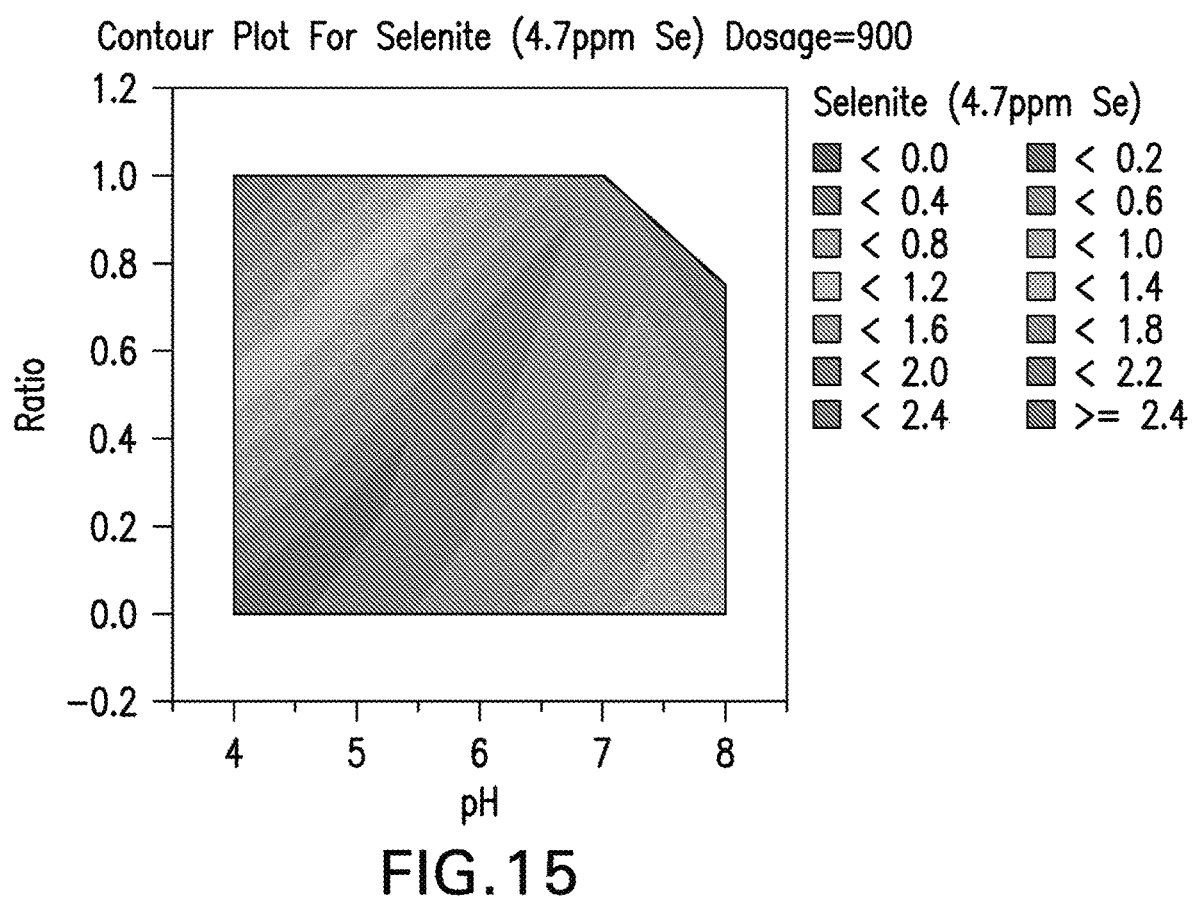

FIG. 11 is a contour plot showing the efficiency of combinations of CeCl3 and ACH in removing phosphate at various pHs at a dosage of 720 ppm. In contrast to the FIG. 10 plot, at higher dosages of product, the locations on the plot corresponding to synergies can shift. At higher dosages, a higher pH is more advantageous when looking at CeCl3/ACH blends.

FIGS. 12-15 are additional contour plots illustrating the efficiency of FeCl3/CeCl3 blends in removing target analytes such as arsenite, arsenate, and selenite at different dosages.

What is claimed is:

1. A method of treating water containing phosphate in an amount of 2 ppm to 1,000 ppm to remove the phosphate, the method comprising:
    determining the pH and/or alkalinity of the water;
    controlling the pH of the water to be within a target range of 5 to 7.0,
    adding to the water at least one rare earth metal salt and at least one coagulant in a weight ratio, (rare earth metal salt/(the rare earth metal salt+the at least one coagulant)), that is in a range of 0.6 to 0.9, the coagulant being selected from the group consisting of ferric sulfate, ferric chloride, potassium aluminum sulfate (Alum), aluminum chloride, aluminum sulfate, polyaluminum chloride, aluminum chlorohydrate, calcium chloride, magnesium chloride, bentonite clay, modified starches, tannins, and lignins; and
    then removing the phosphate from the water, wherein (i) the target range is selected and (ii) an amount of the rare earth metal salt and the coagulant are added, so that at least 50 wt. % of the phosphate is removed from the water.

2. The method according to claim 1, wherein (i) the target range is selected and (ii) an amount of the rare earth metal salt and the coagulant are added, so that at least 75 wt. % of the phosphate is removed from the water.

3. The method according to claim 2, wherein the total amount, on a dry basis, of the rare earth metal salt and the coagulant added to the water is in the range of 25 ppm to 1,000 ppm (wt./wt.).

4. The method according to claim 1, further including adjusting the pH and/or alkalinity to be within the target range by adding to the water at least one of an acid, a base, and a buffer.

5. The method according to claim 4, wherein the amount of the at least one acid, base, and buffer is added based on the determined pH.

6. The method according to claim 1, wherein the at least one rare earth metal salt and the at least one coagulant are added to the water as a blend.

7. The method according claim 1, further including a step of determining the target range based on a synergistic high point, for maximum-efficiency removal of the phosphate, of pH values and relative amounts of the rare earth metal salt and coagulant.

8. The method according to claim 1, wherein the at least one coagulant is selected from the group consisting of ferric sulfate, ferric chloride, potassium aluminum sulfate (Alum), aluminum chloride, aluminum sulfate, polyaluminum chloride, aluminum chlorohydrate, calcium chloride, and magnesium chloride.

9. The method according to claim 1, wherein the target pH is within a range of from 5 to 6.5.

10. The method according to claim 1, wherein the pH of the water is maintained within the target range throughout the adding and removing steps.

11. The method according to claim 1, wherein the rare earth metal salt is a cerium salt.

12. The method according to claim 1, wherein the rare earth metal salt is added in a weight ratio, (rare earth metal salt/(the rare earth metal salt+the at least one coagulant)), that is in a range of 0.6 to 0.7.

13. The method according to claim 1, wherein the total amount, on a dry basis, of the rare earth metal salt and the coagulant added to the water is in a range of 150 ppm to less than 750 ppm (wt./wt.).

14. The method according to claim 1, wherein the at least one coagulant includes at least one salt selected from the group consisting of an aluminum salt and an iron salt, and the at least one coagulant is added to the water in an amount of from 100 ppm to 400 ppm.

15. The method according to claim 1, wherein, before the water is treated, the phosphate is present in the water in an amount that is in a range of 10 ppm to 200 ppm.

16. The method according to claim 1, wherein (i) the target range is selected and (ii) an amount of the rare earth metal salt and the coagulant are added, so that at least 90 wt. % of the phosphate is removed from the water.

17. The method according to claim 1, wherein (i) the target range is selected and (ii) an amount of the rare earth metal salt and the coagulant are added, so that at least 95 wt. % of the phosphate is removed from the water.

18. The method according to claim 1, wherein (i) the target range is selected and (ii) an amount of the rare earth metal salt and the coagulant are added, so that at least 99 wt. % of the phosphate is removed from the water.

* * * * *